(No Model.)
H. G. HUBERT.
MOLD FOR CASTING SAW TEETH.
No. 382,088. Patented May 1, 1888.
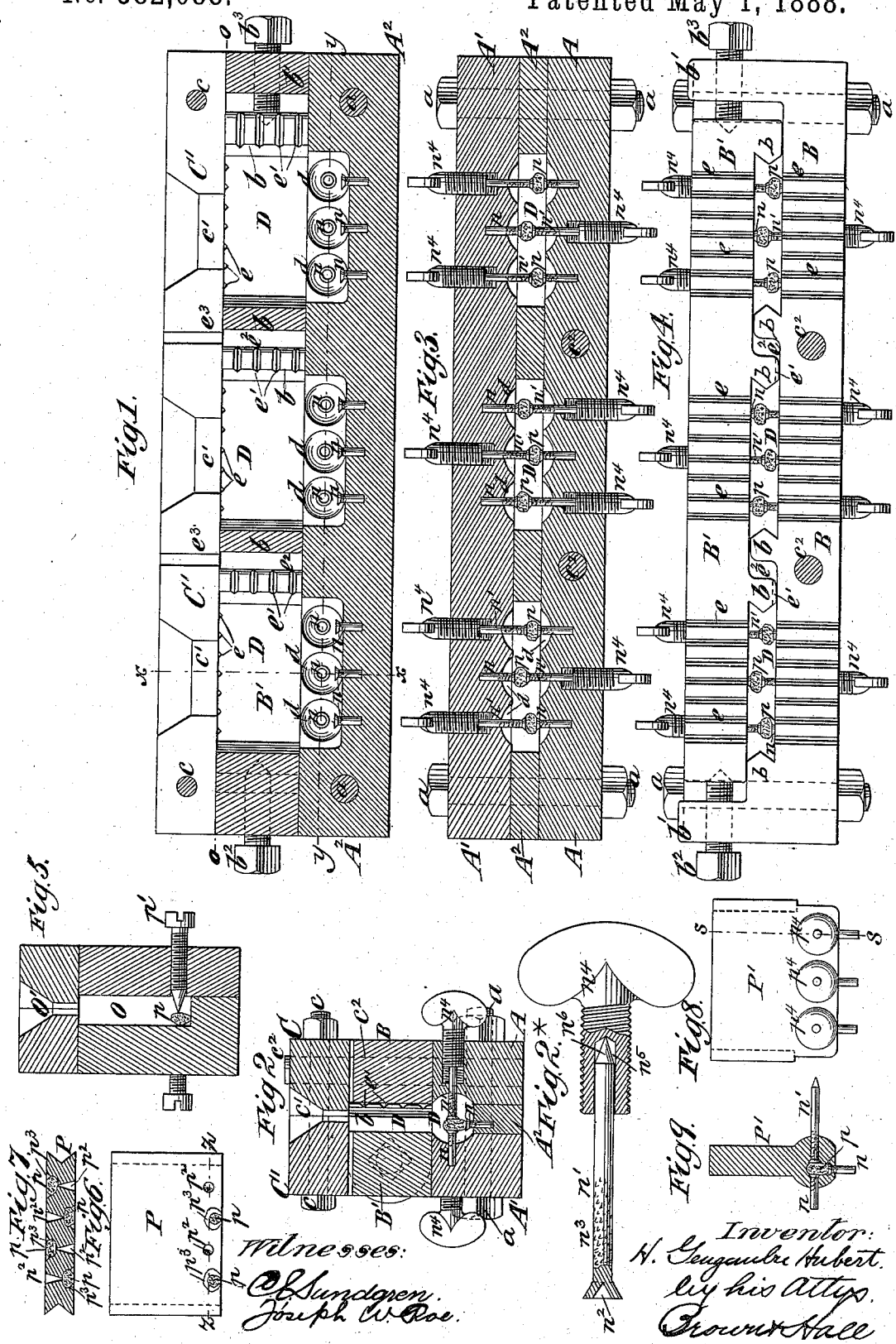

UNITED STATES PATENT OFFICE.

H. GENGEMBRE HUBERT, OF NEW YORK, N. Y.

MOLD FOR CASTING SAW-TEETH.

SPECIFICATION forming part of Letters Patent No. 382,088, dated May 1, 1888.

Application filed February 29, 1888. Serial No. 265,687. (No model.)

*To all whom it may concern:*

Be it known that I, H. GENGEMBRE HUBERT, of the city and county of New York, in the State of New York, have invented a new and useful Improvement in Molds for Casting the Teeth of Diamond Saws, of which the following is a specification.

In modern stone sawing machines, in which the saw-blade is armed with diamonds or other hard stones, the diamonds are secured in teeth which severally consist of small blocks or pieces of metal—as steel—detachably secured in the saw-blade. These small pieces or blocks of steel which contain the diamonds are termed the "teeth" of the saw. Formerly to insert the diamonds in these teeth a small cavity or recess was drilled in the tooth of sufficient size to receive the diamond, and after dropping the diamond into such recess or cavity the metal of the tooth was calked down over the edges of the stone, so as to hold it in place. More recently the diamonds or stones have been placed in a suitably-constructed mold and molten metal, usually steel, has been cast into the mold, so as to secure the diamond in place in the tooth by the operation of casting the tooth. When this latter course is followed, it is necessary to hold the diamonds in place in the mold-cavity, so that the molten metal, when poured in, will not displace them, and this has been done by means of pins or screws which have taper or conical points, and which are employed one for each diamond in a tooth to press that diamond against the opposite side of the mold-cavity, and thus hold it in place. When the diamond is thus held in place, the tooth, after casting, will have in one side a conical hole formed by the pin or screw and in the other side will have a larger cavity or opening formed by the chilling of the metal which flows around the diamond and against the wall of the mold in contact with which the diamond rests, and these holes are subsequently filled up by brazing, in order to give the tooth a solid and perfect appearance, and also that the diamond will be more securely held.

The object of my invention is to provide a mold in which the diamond is held by pins entirely out of contact with the walls of the mold and in the mold-cavity at a distance from both sides thereof, so that when the metal is cast it will flow completely around and fully envelop the diamond, and the pins which support the diamond will be embedded in the metal of the tooth, and after the tooth is removed from the mold may be cut off flush with the metal thereof.

The invention will be hereinafter described, and particularly pointed out in the claims.

In the accompanying drawings, Figure 1 is a longitudinal section of a mold embodying my invention, and which is constructed with three tooth-cavities, so that three teeth may be cast therein at one operation. Fig. 2 is a transverse section of the mold upon the plane indicated by the dotted line $x\,x$, Fig. 1. Fig. 2* is a partly sectional side view, upon a larger scale, of one of the screws and pins employed in my mold. Fig. 3 is a horizontal section upon the plane indicated by the dotted line $y\,y$, Fig. 1. Fig. 4 is a plan view or horizontal section upon the plane indicated by the dotted line $o\,o$, Fig. 1. Fig. 5 is a transverse section of a mold which has been heretofore in use for casting teeth. Fig. 6 is a side view of a tooth which may be cast in the mold shown in Fig. 5. Fig. 7 is a section through that tooth upon about the plane indicated by the dotted line $z\,z$, Fig. 6. Fig. 8 is a side view of a tooth which has been cast in my mold; and Fig. 9 is a sectional view of that tooth upon the plane indicated by the dotted lines $s\,s$, Fig. 8.

Similar letters of reference designate corresponding parts in all the figures.

My invention in no way applies to the mold shown in Fig. 5 or to the tooth shown in Figs. 6 and 7, and these views are simply made to illustrate one form of mold heretofore used and the tooth cast in that mold, in order that the salient points of my invention may be more clearly apparent.

I will first refer to Figs. 5, 6, and 7. The mold is constructed with a cavity, O, for the reception of the molten metal through the pouring-hole O', and $p$ designates the diamonds, which are held in the mold-cavity. The tooth P (represented in Figs. 6 and 7) is shown as having four diamonds $p$ at intervals in its length, and which are cast in the tooth so that alternate diamonds are near one face or side of the tooth, while the intermediate diamonds are near the other face or side thereof. By means of a set-screw, $p'$, which has a conical point, as shown in Fig. 5, each diamond $p$ is held in place close against the opposite wall of the cavity O, and these screws $p'$ are inserted alternately from opposite sides of the mold. When the tooth is cast and removed from the mold, it will have on one side of each diamond a conical cavity, $p^2$, which was formed by the point of the screw, and on the other side of each diamond will be a larger cavity, $p^3$, as is best shown in Fig. 7. This larger cavity, $p^3$, is formed by the chilling of the metal against the wall of the mold in contact with which the diamond is held, as by such chilling the molten metal is prevented from flowing around the diamond on that side of the tooth as far as it otherwise would. After these teeth are cast they are brazed, so that the holes or cavities $p^2 p^3$ become filled with brass and give smooth opposite sides to the tooth and hold the diamonds $p$ more securely in place.

Referring, now, to Figs. 8 and 9, which show a tooth cast in my mold, P' designates the tooth, and $p$ designates the diamonds, which are embedded therein. $n n'$ designate pins whereby the diamond is held in place in the mold-cavity, as I shall hereinafter describe, and which in the operation of casting become embedded in the metal of the tooth P' and are subsequently cut off flush with the outer surfaces of the tooth. These pins, which may consist simply of small wire nails, are so small that the body of metal in them is not sufficient to chill the metal of the tooth when cast, and consequently the metal flows freely around the pins, as shown in Fig. 9, and by its shrinkage holds fast upon the pins embedded within it, so that when these pins are cut off the joint which they form with the metal of the tooth can scarcely be detected. I prefer that the pins $n n'$, at least those pins which bear against opposite sides of the diamond, shall have their ends formed with slightly concave or conical cavities $n^2$, as shown in Fig. 2*, so that such cavities will receive the points or projections of the diamond and will hold the latter more securely in place and prevent its slipping out from between the pins when they are tightened up against it. These concave recesses or conical cavities $n^2$ may be formed by setting the pin or nail in a hole in a block of metal and then striking upon their ends a sharp blow with a center-punch. The surfaces of those portions of the pins which are to be embedded in the metal of the tooth P' may be roughened, as by grooving them or striking up spurs from them, as shown at $n^3$ in Fig. 2*.

I will now describe by reference to Figs. 1, 2, 2*, 3, and 4 the mold which forms the subject of my invention.

The lower portion of the mold is composed of sections A A', and in this example of the invention they have between them a third section, $A^2$, these three sections being clamped together when the mold is closed for casting by means of bolts $a$. Above the lower part of the mold is an intermediate part composed of the sections B B', which are held together as I shall soon describe, and above the sections B B' is the upper part, which is composed of sections C C', held together by bolts $c$, and in which are the pouring-cavities $c'$. The three parts of the mold—namely the lower part, the intermediate or middle part, and the upper part—may be properly centered in place by steady-pins $c^2$, passing through them, as shown in Figs. 3 and 4 and by dotted lines in Fig. 2.

D designates the mold-cavities, with which the pouring-holes $c'$ communicate and which are formed principally between the sections B B' of the mold, but which extend downward into the lower portion between the sections A A', as is best shown in Figs. 1 and 2. I have shown the lower part of the mold cavity, which is formed between the sections A A', as having upon opposite sides lateral enlargements or recesses $d$, and consequently the teeth when cast in the cavities D have upon opposite sides protuberances or lumps $p^4$, as is represented in Figs. 8 and 9. The diamonds $p$ are held in proper position in the mold-cavities by the pins $n n'$, as before described. As here represented, pins $n$ are inserted downward into the portion of the mold which forms the bottom of the cavities D—in this instance into the section $A^2$—and upon these pins the diamond rests, while it is held against lateral displacement by the pins $n n'$, which bear against opposite sides of it. The several pins $n n'$ are all of them removably fitted in the mold-sections, so that after the teeth are cast and when removing them from the mold the pins embedded in the teeth by the operation of casting are readily withdrawn with the teeth from the mold-cavities. In the present example of my invention the pins $n'$ are set up and held in place to properly hold the diamond, each by means of a thumb screw or set screw, $n^4$, which is tapped into a socket or cavity in the mold sections, and, as best shown in Fig. 2*, each screw $n^4$ has a central cavity, $n^5$, which receives the pin $n'$, and the pointed end $n^6$ of said pin bears against the bottom of said cavity $n^5$. Consequently the screw $n^4$ may be turned to press the pin $n'$ against the diamond without imparting any turning movement to the pin and thereby incurring the liability of the diamond being displaced. I have here represented three diamonds as held in place in each mold-cavity D, and it will be understood that a greater or less number than three may be cast into each tooth. As best shown in Fig. 3, the several diamonds $p$ in each tooth are not in a straight line, but are staggered in position, alternate stones being nearer one side of the cavity D and the intermediate stone or stones being nearer the opposite side of the cavity D. The upper sections, C C', and the intermediate sections, B B', of the mold may readily be removed from the lower sections, A A', and are so removed during the operation of setting the diamonds $p$ in place in the mold-cavities and adjusting the screws $n^4$ so as to properly secure the diamonds.

As best shown in Fig. 4, the sections B B' of the mold have upon their adjacent faces vertical ribs $b$, and the section B has at its ends lugs or ears $b'$, in which are inserted screws $b^2$ $b^3$. The section B' is placed between the lugs or ears $b'$, with its ribbed face against the ribbed face of the section B, as is shown in Fig. 4, and by the screws $b^2$ $b^3$ the section B' is held immovable relatively to the section B. The ribs $b$ on one section, B, enter between the ribs $b$ on the opposite section, B', and the corresponding ends—for instance, the right-hand ends—of all the mold-cavities D are formed by ribes $b$ on one section, B', while the other corresponding ends—for example, the left-hand ends—of all the mold-cavities D are formed by the ribs $b$ upon the other section, B. To remove the teeth after casting from the mold-cavities D, the screw $b^3$, for example, is loosened, so that the section B' may be slipped toward the right relatively to the section B, thus removing the end walls of each mold-cavity D from each other and permitting the easy removal of the teeth from the mold-cavities. After the removal of the teeth the lumps $p^4$ and all portions of the metal outside the cutting-faces of the stones may be ground off by grindstones or other means to expose the said faces; but for operating on some gritty kinds of stone this preparatory grinding is not necessary, as the grinding off of the superfluous metal may be rapidly effected during a few strokes of the saw by the action of the stone on which the saw is put in operation.

When the parts of the mold are assembled again for casting more teeth, it is necessary that the mold cavities D be adjusted to the exact length required, and this is done at one operation by means of the set-screws $b^2$ $b^3$, because the corresponding ends of all the mold-cavities are formed by the ribs $b$, as before described. The screw $b^2$, for example, may serve as the adjusting-screw, and when it is adjusted to the proper point, so that the mold-cavities D will be of the exact length required, it is not again disturbed, and only the screw $b^3$, which may be termed the "clamping-screw," is slackened in order to enlarge the mold-cavities D in their length and facilitate the removal of the teeth therefrom. To again assemble the parts of the mold, all that is necessary is to place the section B' against the adjusting-screw $b^2$ and then to set up the clamping-screw $b^3$ until the section B' is held tightly in place relatively to the section B. After the adjusting-screw has been previously set to the proper point the mold-cavities D will be of the exact length required when the screw $b^3$ is set up, without the necessity of the operator paying any particular attention to this adjustment. It will therefore be seen that it is of great advantage to have the ends of the mold-cavities D formed by the ribs $b$, the ribs $b$ forming the right-hand ends of all the cavities being upon one section, B', and the ribs $b$ forming the left-hand ends of all the cavities being upon the other section, B, as before described, because of the facility which is thus afforded for adjusting all the mold-cavities D to the exact length required.

When the ends of the mold-cavities are formed by separate pieces or blocks placed between the two side sections, B B', and each separately adjustable, the adjustment of these pieces or blocks each time the parts of the mold are assembled together, in order to give the exact length required to each of the mold-cavities, becomes a matter of considerable labor and great nicety, and such careful and separate adjustment is all done away with by my invention. As shown in Fig. 4, the faces of the ribs $b$ which form the ends of the mold-cavities D are V-shaped, so that the teeth cast in such cavities will have their opposite ends V-shaped, and thus be adapted to be fitted in the gaps or recesses in the edge of a saw-blade.

In order to vent the mold-cavities, I form in the meeting or bearing faces of one or more of the separable sections of which the mold is composed fine or small grooves which lead from the mold-cavities and serve for venting it. I have here represented the upper faces of the sections B B' as having a considerable number of small grooves, $e$, cut in them and leading outward from the mold-cavity D. The mold-cavity D is properly vented through these small grooves $e$, and when the metal rises to the grooves it is chilled before it can fill them and will flow outward into the grooves but a small fraction of an inch. The small spurs or projections which are formed on the teeth by the metal running over slightly into these vent holes or grooves $e$ may without difficulty be broken or cut away from the teeth, and do not at all interfere with the ready removal of the teeth from the mold-cavities.

For more thoroughly venting the mold-cavities I may cut horizontal grooves $e'$, which are also small, in the outer face of certain of the ribs $b$, as best shown in Figs. 1 and 2, and through these grooves the mold-cavity vents into the space $e^2$ between adjacent ribs $b$, and thence through an opening, $e^3$, formed in the upper mold-sections, C C', vents to the atmosphere.

I do not claim, broadly, as of my invention a mold provided with pins or screws for holding the diamonds in place within the mold-cavity; but limit my invention to pins which are removably fitted in the mold in positions opposite each other and which project into the mold-cavity from opposite sides thereof, whereby a stone supported between the ends of such pins will, when the tooth is cast, be completely surrounded by metal in which the pins will be embedded.

What I claim as my invention, and desire to secure by Letters Patent, is—

1. The combination, in a mold for casting saw-teeth with diamonds or other hard stones, of the mold-sections constructed to form a cavity, and pins removably fitted opposite each other in said sections and projecting into said cavity from opposite sides thereof, whereby a stone supported between the ends of said pins will, when the tooth is cast, be completely surrounded by metal in which the pins are embedded, substantially as herein described.

2. The combination, with mold-sections forming a cavity between them, of pins $n\ n'$, removably fitted in said sections and projecting into the cavity opposite each other, the said pins having cup-shaped or concaved inner ends for more securely retaining a stone between them, substantially as herein described.

3. The combination, with the two side sections of a mold having in the cavity formed between them the lateral enlargements $d$, of pins removably fitted in said sections opposite each other and projecting into the cavity on opposite sides thereof and from said lateral enlargements, substantially as herein described.

4. The combination, with the lower mold-sections, $A\ A'\ A^2$, constructed to form portions of mold-cavities, and pins $n n'$, fitted thereto for holding stones therein, of the upper mold-sections, $B\ B'$, supported on said lower mold-sections and provided on their faces with ribs $b$, the said sections $B\ B'$ being placed face to face, with the ribs $b$ of each between the ribs $b$ of the other, and containing portions of mold-cavities which correspond with those in the sections $A\ A'\ A^2$, and which have all their right-hand ends formed by the ribs of one section and all their left-hand ends formed by the ribs of the other section, substantially as herein described.

5. The combination of the mold-sections $B\ B'$, the latter having lugs or ears between which the former is placed, and the two sections having the ribs $b$, and the adjusting and clamping screws $b^2\ b^3$, inserted in the section $B$ and bearing on the ends of the section $B'$, substantially as herein described.

H. GENGEMBRE HUBERT.

Witnesses:
C. HALL,
FREDK. HAYNES.